Jan. 3, 1950    C. L. CLARK    2,492,967
METHOD OF MAKING WHEEL HUBS
Filed May 4, 1945    4 Sheets-Sheet 1

INVENTOR.
Carl L. Clark
BY
Barnes, Kisselle, Laughlin & Raisch
Attorneys

Jan. 3, 1950  C. L. CLARK  2,492,967
METHOD OF MAKING WHEEL HUBS
Filed May 4, 1945  4 Sheets-Sheet 2
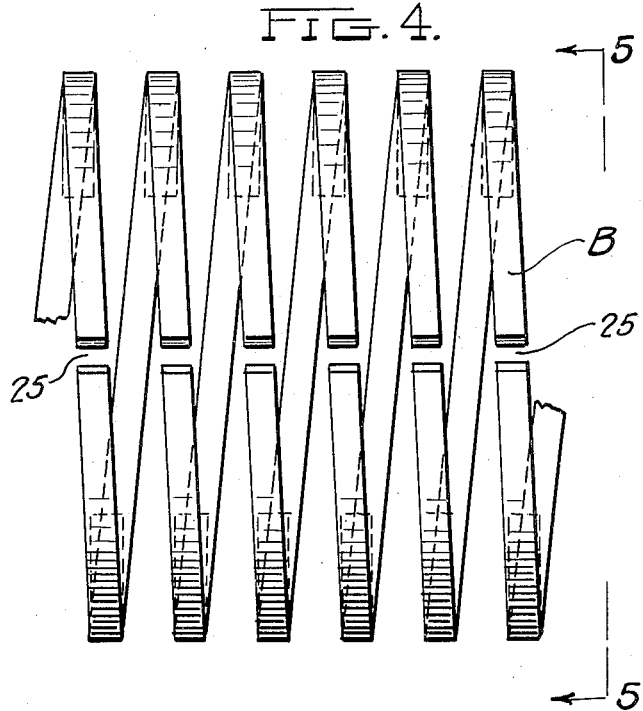
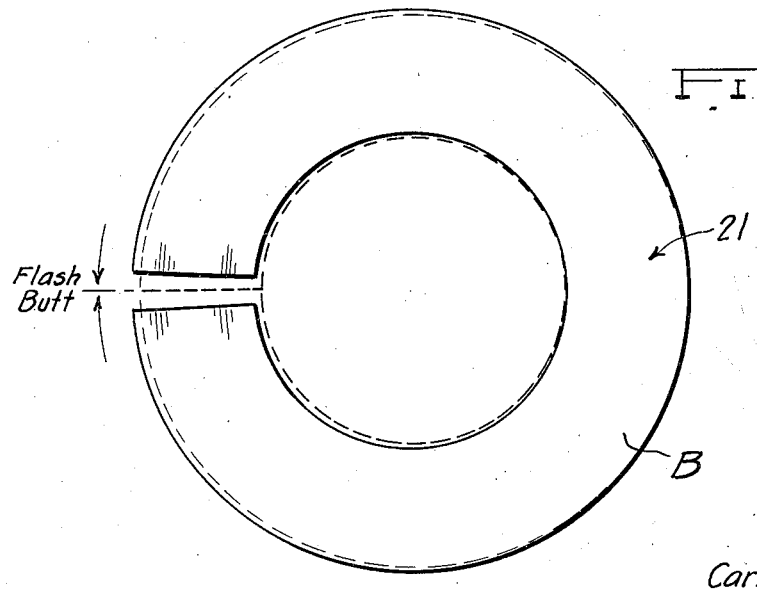
INVENTOR.
Carl L. Clark
BY
Barnes, Kisselle, Laughlin & Raisch
Attorneys Jan. 3, 1950 C. L. CLARK 2,492,967
METHOD OF MAKING WHEEL HUBS
Filed May 4, 1945 4 Sheets-Sheet 3
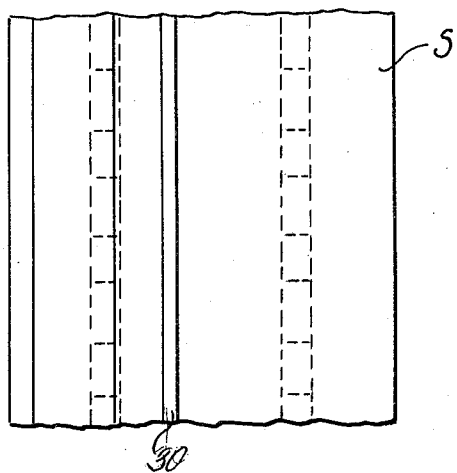
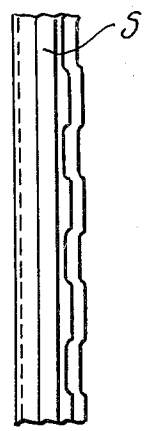
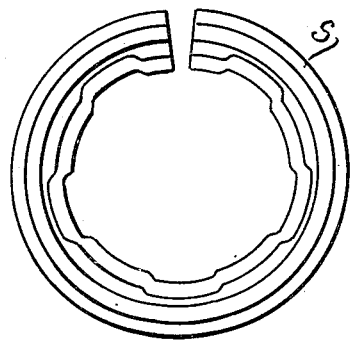
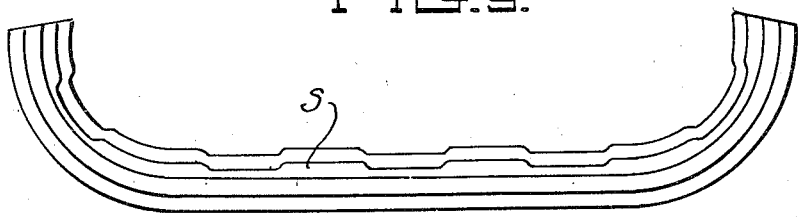
INVENTOR.
Carl L. Clark
BY
Barnes, Kisselle Laughlin & Raisch
Attorneys Jan. 3, 1950 C. L. CLARK 2,492,967
METHOD OF MAKING WHEEL HUBS
Filed May 4, 1945 4 Sheets-Sheet 4

INVENTOR.
Carl L. Clark
BY
Barnes, Kisselle, Laughlin & Raisch
Attorneys

Patented Jan. 3, 1950

2,492,967

UNITED STATES PATENT OFFICE 2,492,967

METHOD OF MAKING WHEEL HUBS

Carl L. Clark, Warren, Ohio, assignor to Mullins Manufacturing Corporation, Salem, Ohio, a corporation of New York Application May 4, 1945, Serial No. 592,021

2 Claims. (Cl. 29—159.3)

This invention relates to a wheel hub assembly and has particularly to do with a method for manufacturing a hub and the article formed by the method.

At present wheel hubs for vehicles such as trucks and automobiles are made from malleable castings. It is an object of the present invention to replace the malleable castings with a steel hub made entirely from bar or strip material, thus effecting a great savings in material cost and in manufacturing cost as well as a substantial saving in time. Malleable castings require skilled labor and considerable time for annealing process.

Other objects and features of the invention will be apparent in the following description and appended claims.

In the drawings:

Fig. 4 is a view of the material of Fig. 3 coiled spherically.

Fig. 5 is an elevation on line 5—5 of Fig. 4.

Fig. 6 is a plan view.

Fig. 7 is a side elevation of the roller section used for the hub body.

Fig. 8 is an end view of the stock shown in Figs. 6 and 7.

Figs. 9 and 10 show steps in the formation of the circular hub.

The hub as shown on the drawings is made of two parts, a hub body or central portion 20 and a flange portion 21.

Figure 3:
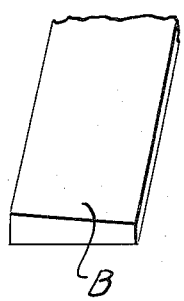
Fig. 3 is a view of the bar or rolled section used to form the flange of the hub.
Figure 11:
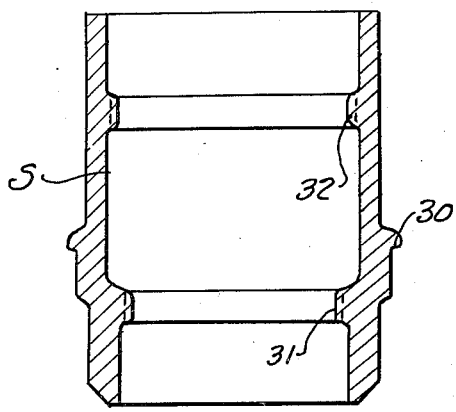
Fig. 11 shows the hub body closed.

The flange is made from a flat bar B, preferably steel, that is coiled spirally and then cut and butt welded to form a ring. The flat stock for this ring is preferably trapezoidal in cross-section as shown in Fig. 3. This trapezoidal flat stock is coiled spirally as shown in Fig. 4.

The convolutions of the coil are cut at 25 to form separate rings. Due to the coiling the trapezoidal shape changes to a rectangular shape because of the thinning up of the outside diameter and the thickening on the inside diameter. After the coil is cut into separate rings, each ring is flattened and the ends thereof flash-butt welded. The rings are then coined flat to uniform thickness and uniform outside and inside diameter. The inside diameter of the hub flange is to have a press fit on the surface of the hub body. Consequently, the inside diameter of the hub flange must either be coined for press fit or bored to the required size. The rings may be formed as complete stampings from flat stock though this is a more wasteful method of manufacture.

Figure 1:
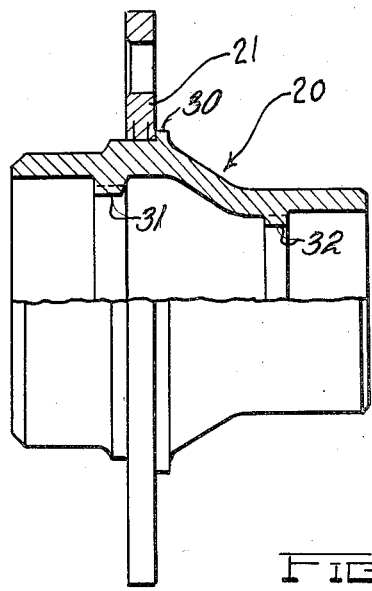
Fig. 1 is a side elevation, quarter section, of a completed hub.
Figure 2:
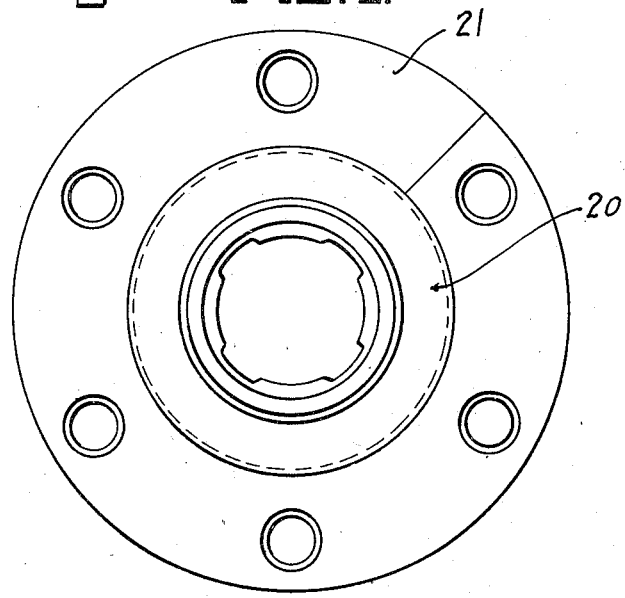
Fig. 2 is an end elevation.
Figure 13:
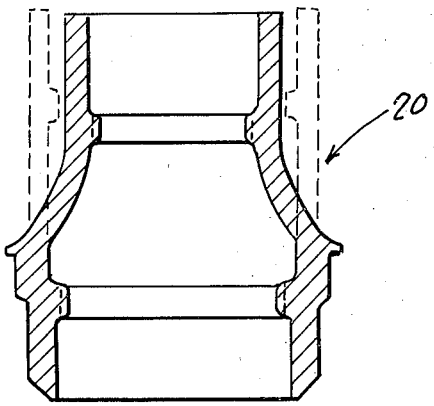
Fig. 13 is a view of the body portion of the hub formed.
Figure 12:
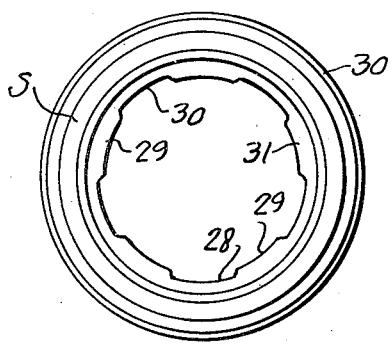
Fig. 12 is an end view of Fig. 11.
Figure 14:
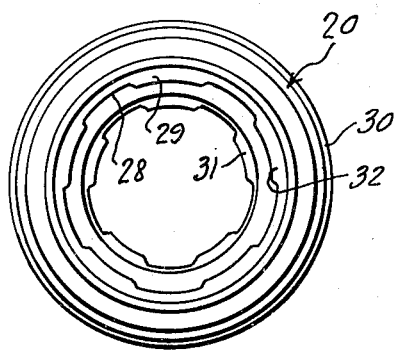
Fig. 14 is an end view of the completed hub body.

The hub body is formed from a special rolled section S of strip steel shown in Figs. 6, 7 and 8. The depressions 28 and projections 29 on the internal beads of the strip are provided as clearance for cutting tools. These depressions may be broached in or formed with the strip. This special rolled section with the internal beads 31 and 32 and external beads 30, is cut to length and in two steps, shown in Figs. 9 and 10, formed into a cylinder, the opening abutting edges of which are butt or flash welded. The flash may be removed by cutters which work on the inside and outside of the body. After the hub body is welded into a cylinder it is shaped as shown in Fig. 13 in a press die and subsequently sized in a die. If desired the operation shown in Fig. 13 may be dispensed with by shaping the original section of the body. This increases the cost of the material, however, and renders more difficult the forming steps of Figs. 9 and 10. The beads 30, 31, and 32, to which reference is made above, are functional in the final assembly. Bead 30 serves as a locating shoulder for the flange 21 as shown in Figure 1. Beads 31 and 32 serve to define bearing seats commonly provided in this type of hub.

After the two parts 20 and 21 are formed they are united into the assembly shown in Fig. 1 by press fitting the flange on to the hub body and brazing the two parts to make the assembly. The result is a hub which can be made in a fraction of the time required to make a malleable casting and with simple stamping, forming and welding operations available in almost any well equipped shop today.

The hub body may be made in two halves from the special rolled section, the halves being held in place by the ring flange. The entire assembly is then brazed with copper.

What I claim is:

1. A method of making a wheel hub from rolled section which comprises rolling a section of varying thickness with spaced integral longitudinal beads on one surface to form bearing seats at both ends, rolling a length of said section into cylindrical form, the diameter of the bearing seat at one end being smaller than the diameter at the other end whereby the bearing seat of the small end is presented from broaching, broaching the small end to desired form, then reducing the diameter of the large end so that its diameter is less than that of the previously small end whereby the bearing seat of the reduced end is presented for broaching, and broaching the final small end to desired form.

2. A method of making a wheel hub from rolled sections comprising a flange ring and a cylindrical hub body, which method comprises rolling strip stock to a solid cross section of varying thickness and contour having spaced bearing beads adjacent each edge on one side and a flange-ring bead on the other side, rolling lengths of the stock to form a cylindrical hub body having bearing seats at both ends, the diameter of the bearing seat at the flange end being smaller than the diameter of the other end because of the rolled contour whereby the bearing seat of the flange end is presented for broaching, broaching the small end to desired form, then reducing the diameter of the flange end so that its diameter is less than the other end whereby the bearing seat of the reduced end is presented for broaching, and broaching the final small end to desired form.

CARL L. CLARK.

REFERENCES CITED

The following references are of record in the file of this patent:

UNITED STATES PATENTS

| Number | Name | Date |
|---|---|---|
| 614,166 | Fox | Nov. 15, 1898 |
| 1,032,718 | White | July 16, 1912 |
| 1,230,427 | Murray | June 16, 1917 |
| 1,587,020 | Michelin | June 1, 1926 |
| 1,601,559 | Clark | Sept. 28, 1926 |
| 1,694,779 | Hicks | Dec. 11, 1928 |
| 1,698,083 | Booth | Jan. 8, 1929 |
| 1,703,714 | Booth | Feb. 26, 1929 |
| 1,704,369 | Nelson | Mar. 5, 1929 |
| 1,762,556 | Marshall | June 10, 1930 |
| 1,811,996 | Eksergian | June 30, 1931 |
| 1,902,222 | Eksergian | Mar. 21, 1933 |
| 1,906,578 | Grothes | May 2, 1933 |
| 1,928,911 | Riemenschneider et al. | Oct. 3, 1933 |
| 1,931,161 | Kranz | Oct. 17, 1933 |
| 1,931,162 | Kranz et al. | Oct. 17, 1933 |
| 1,965,203 | Sinclair | July 3, 1934 |